US012606056B2

(12) United States Patent
Yang

(10) Patent No.: US 12,606,056 B2
(45) Date of Patent: Apr. 21, 2026

(54) VEHICLE AND METHOD OF CONTROLLING POWER THEREOF

(71) Applicants: HYUNDAI MOTOR COMPANY, Seoul (KR); KIA CORPORATION, Seoul (KR)

(72) Inventor: Heegun Yang, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 404 days.

(21) Appl. No.: 18/077,501

(22) Filed: Dec. 8, 2022

(65) Prior Publication Data

US 2023/0373351 A1 Nov. 23, 2023

(30) Foreign Application Priority Data

May 18, 2022 (KR) ........................ 10-2022-0060935

(51) Int. Cl.
B60N 2/00 (2006.01)
B60N 2/56 (2006.01)

(52) U.S. Cl.
CPC ........... B60N 2/002 (2013.01); B60N 2/0021 (2023.08); B60N 2/0024 (2023.08); B60N 2/0025 (2023.08); B60N 2/5678 (2013.01);

*B60N 2210/12* (2023.08); *B60N 2210/20* (2023.08); *B60N 2210/24* (2023.08); *B60N 2210/26* (2023.08); *B60N 2210/40* (2023.08)

(58) Field of Classification Search
None
See application file for complete search history.

(56) References Cited

U.S. PATENT DOCUMENTS

| | | | |
|---|---|---|---|
| 2013/0030645 A1* | 1/2013 | Divine | ................... B60K 35/28 |
| | | | 709/217 |
| 2014/0074480 A1* | 3/2014 | Gratke | ................ B60R 16/0373 |
| | | | 704/E11.001 |
| 2018/0257523 A1* | 9/2018 | Dacosta-Mallet | ..... B60N 2/565 |
| 2021/0209927 A1* | 7/2021 | Hedges | ................ G08B 25/005 |
| 2023/0356729 A1* | 11/2023 | Gu | ......................... G06V 20/59 |

* cited by examiner

*Primary Examiner* — Adam D Tissot
*Assistant Examiner* — Laura E Linhardt
(74) *Attorney, Agent, or Firm* — Morgan, Lewis & Bockius LLP

(57) ABSTRACT

A method of controlling power of a vehicle includes an individual device provided on each seat of the vehicle to be independently operated by an occupant of a corresponding seat, for detecting whether the occupant is present in each seat of the vehicle and turning off the individual device provided on the corresponding seat when a vacant seat in which no occupant is present is detected.

18 Claims, 5 Drawing Sheets

Figure 4:
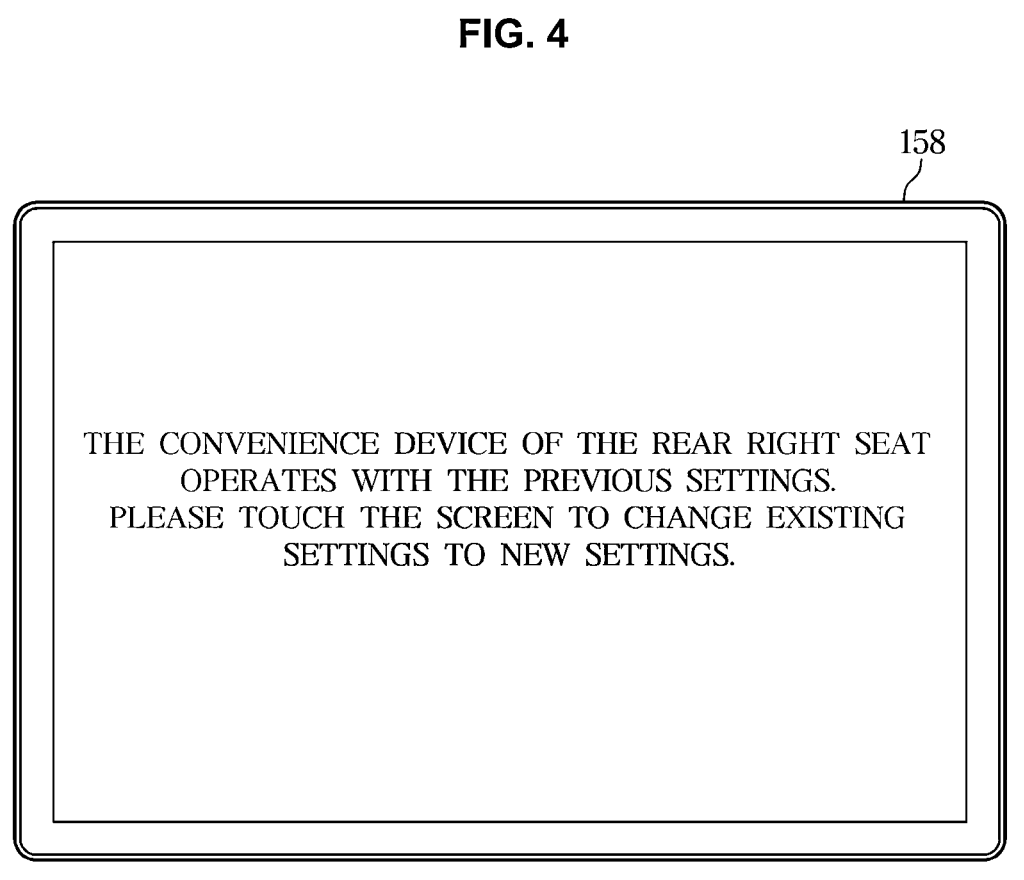

THE CONVENIENCE DEVICE OF THE REAR RIGHT SEAT
OPERATES WITH THE PREVIOUS SETTINGS.
PLEASE TOUCH THE SCREEN TO CHANGE EXISTING
SETTINGS TO NEW SETTINGS.

1

VEHICLE AND METHOD OF CONTROLLING POWER THEREOF

CROSS-REFERENCE TO RELATED APPLICATION

The present application claims priority to Korean Patent Application No. 10-2022-0060935, filed on May 18, 2022, the entire contents of which is incorporated herein for all purposes by this reference.

BACKGROUND OF THE PRESENT DISCLOSURE

Field of the Present Disclosure

The present disclosure relates to a vehicle, and more particularly, to a method of controlling power of the vehicle.

Description of Related Art

In some vehicle models, individual devices are provided on each seat inside a vehicle so that an occupant of the corresponding seat may operate the devices independently. The individual devices may include, for example, at least one of a heating wire seat, a ventilation seat, an air conditioner, and a monitor.

The individual devices are selectively used by occupants accommodated in each seat according to their needs without a driver's intervention. Therefore, when the occupant of the corresponding seat does not turn off the individual devices of the seat on which he/she has sat upon getting off the vehicle, the corresponding individual devices continue to operate after getting off and power may be consumed unnecessarily.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to automatically turn off an individual device of a seat in which no occupant is present after checking whether the occupant is present in each seat of a vehicle.

Additional aspects of the present disclosure will be set forth in part in the description which follows, and in part, will be obvious from the description, or may be learned by practice of the present disclosure.

In accordance with one aspect of the present disclosure, a method of controlling power of a vehicle including an individual device provided on each seat of the vehicle to be independently operated by an occupant of a corresponding seat includes detecting whether the occupant is present in each seat of the vehicle, and when a vacant seat in which no occupant is present is detected, turning off the individual device provided on the corresponding seat.

The method may further include determining whether a new occupant is a same person as a previous occupant of the corresponding seat when the new occupant is accommodated in the vacant seat and maintaining existing settings of the individual device of the corresponding seat without change of the existing settings to operate the individual device when the controller concludes that the new occupant is the same person as the previous occupant.

The method may further include outputting a guide message for selecting whether to maintain or change the existing settings of the individual device of the corresponding seat when the controller concludes that the new occupant is the same person as the previous occupant.

The outputting of the guide message may include at least one of outputting a voice through a speaker and outputting a text through a display.

The method may further include receiving new settings of the individual device from the new occupant when the new occupant is not the same person as the previous occupant and operating the individual device of the corresponding seat based on the new settings of the individual device.

The detecting of whether the occupant is present and the determining of whether the new occupant is the same person may be performed by analyzing an image captured using at least one of an indoor camera of the vehicle and a surround view monitoring camera of the vehicle.

The detecting of whether the occupant is present and the determining of whether the new occupant is the same person may be performed using at least one of a radar and an ultrasonic sensor of the vehicle.

The detecting of whether the occupant is present and the determining of whether the new occupant is the same person may be performed using at least one of a weight sensor and a permittivity sensor of the vehicle.

In accordance with another aspect of the present disclosure, a vehicle includes an individual device provided on each seat of the vehicle to be independently operated by an occupant of a corresponding seat, an occupant detector provided to detect whether the occupant is present inside the vehicle and identify the occupant, and a controller operatively connected to the individual device and the occupant detector and configured to detect whether the occupant is present in each seat of the vehicle using the occupant detector, and when a vacant seat in which no occupant is present is detected, turn off the individual device provided on the corresponding seat.

The controller may be configured to determine whether a new occupant is a same person as a previous occupant of the corresponding seat when the new occupant is accommodated in the vacant seat and maintains existing settings of the individual device of the corresponding seat without change of the existing settings to operate the individual device when the controller concludes that the new occupant is the same person as the previous occupant.

The controller may output a guide message for selecting whether to maintain or change the existing settings of the individual device of the corresponding seat when the controller concludes that the new occupant is the same person as the previous occupant.

The output of the guide message may include at least one of a voice output through a speaker and a text output through a display.

The controller is configured to receive new settings of the individual device from the new occupant when the new occupant is not the same person as the previous occupant and operate the individual device of the corresponding seat based on the new settings of the individual device.

The detecting of whether the occupant is present and the determining of whether the new occupant is the same person may be performed by analyzing an image captured using at least one of an indoor camera of the vehicle and a surround view monitoring camera of the vehicle.

The detecting of whether the occupant is present and the determining of whether the new occupant is the same person may be performed using at least one of a radar and an ultrasonic sensor of the vehicle.

The detecting of whether the occupant is present and the determining of whether the new occupant is the same person may be performed using at least one of a weight sensor and a permittivity sensor of the vehicle.

In accordance with yet another aspect of the present disclosure, a method of controlling power of a vehicle including an individual device provided on each seat of the vehicle to be independently operated by an occupant of a corresponding seat includes detecting whether the occupant is present in each seat of the vehicle, turning off the individual device provided on the corresponding seat when a vacant seat in which no occupant is present is detected, determining whether a new occupant is a same person as a previous occupant of the corresponding seat when the new occupant is accommodated in the vacant seat, outputting a guide message for selecting whether to maintain or change existing settings of the individual device of the corresponding seat when the new occupant is the same person as the previous occupant, maintaining, by the new occupant, the settings of the individual device of the corresponding seat as the existing settings without change to operate the individual device, receiving new settings of the individual device from the new occupant when the new occupant is not the same person as the previous occupant, and operating the individual device of the corresponding seat based on the new settings of the individual device.

The detecting of whether the occupant is present and the determining of whether the new occupant is the same person may be performed by analyzing an image captured using at least one of an indoor camera of the vehicle and a surround view monitoring camera of the vehicle.

The detecting of whether the occupant is present and the determining of whether the new occupant is the same person may be performed using at least one of a radar and an ultrasonic sensor of the vehicle.

The detecting of whether the occupant is present and the determining of whether the new occupant is the same person may be performed using at least one of a weight sensor and a permittivity sensor of the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 4 is a view showing an output of a guide message for guiding a change in existing settings.

4

Figure 1:
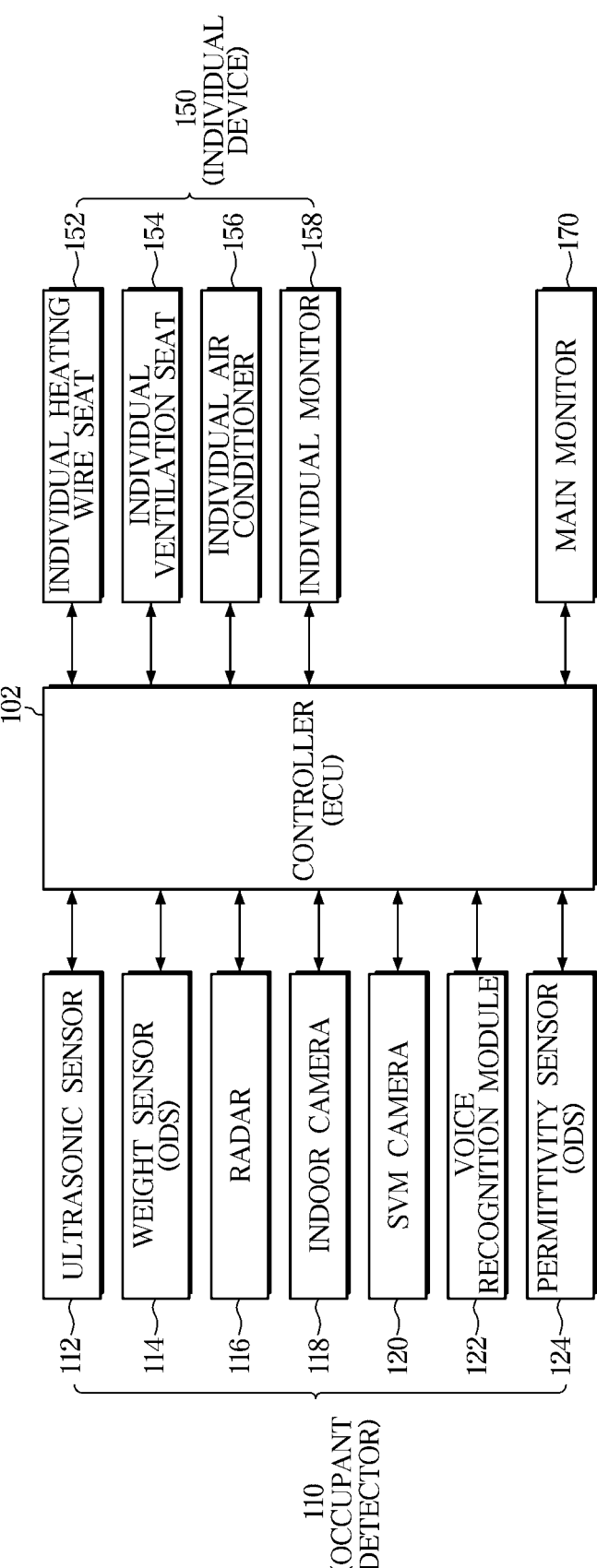
FIG. 1 is a view showing a control system of a vehicle according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The same reference numerals refer to the same components throughout the specification. The specification does not describe all elements of the embodiments, and general contents in the art to which the present disclosure pertains or overlapping contents among the exemplary embodiments will be omitted. Terms "unit, module, member, and block" used in the specification may be implemented in software or hardware, and according to the embodiments, a plurality of "units, modules, members, and blocks" may be implemented as one component or one "unit, module, member, and block" may also include a plurality of components.

Throughout the specification, when a certain portion is referred to as being "connected" to another portion, it includes not only a case in which the certain portion is directly connected to another portion but also a case in which it is indirectly connected thereto, and the indirect connection includes a connection through a wireless communication network.

In addition, when a certain portion is referred to as "including" a certain component, it means that other components may be further included, rather than excluding the other components unless otherwise stated.

Throughout the specification, when a certain member is referred to as being positioned "on" another member, this includes not only a case in which one member comes into contact with another member but also a case in which other members are present between the two members.

Terms such as first and second are used to distinguish one component from another, and the components are not limited by the above-described terms.

The singular expression includes the plural expression unless the context clearly dictates otherwise.

In each operation, identification signs are used for convenience of description, the identification signs do not describe the order of each operation, and each operation may be performed differently from the specified order unless the context clearly states the specific order.

Hereinafter, an operating principle and embodiments of the present disclosure will be described with reference to the accompanying drawings.

A user terminal may be implemented as a computer or a portable terminal which may access a vehicle through a network. Here, the computer may include, for example, a notebook personal computer (PC), a desktop PC, a laptop PC, a tablet PC, a slate PC, or the like provided with a web browser, and the portable terminal is a wireless communication device with guaranteed portability and mobility and may include, for example, any type of a handheld-based wireless communication device such as a personal communication system (PCS), global system for mobile communication (GSM), a personal digital cellular (PDC), a personal handyphone system (PHS), a personal digital assistant (PDA), international mobile telecommunication (IMT)-2000, code division multiple access (CDMA)-2000, W-CDMA, a wireless broadband Internet (WiBro) terminal, or a smart phone or a wearable device such as a watch, a ring, a bracelet, a anklet, a necklace, glasses, a contact lens, or a head-mounted device (HMD).

FIG. 1 is a view showing a control system of a vehicle according to an exemplary embodiment of the present disclosure.

In FIG. 1, a controller 102 may be an electronic control unit (ECU) provided to perform a method of controlling the vehicle according to the exemplary embodiment of the present disclosure. The controller 102 is communicatively connected to an occupant detector 110, an individual device 150, and a main monitor 170.

The occupant detector 110 is provided to detect whether the occupant is present in each seat of the vehicle. In other words, the controller 102 detects whether a current occupant gets on the vehicle and is accommodated in each seat of the vehicle using the occupant detector 110. Furthermore, the controller 102 detects whether the occupant gets off and then gets on the vehicle again and is accommodated in each seat of the vehicle. Whether the occupant gets off and then gets on the vehicle again is determined only within the same start ON state of the vehicle. In other words, the controller 102 detects whether the occupant gets off and then gets on the vehicle again during a time from start ON (or power ON) to start OFF (or power OFF) of the vehicle. The occupant detector 110 may include at least one of an ultrasonic sensor 112, a weight sensor 114, a radar 116, an indoor camera 118, a surround view monitoring (SVM) camera 120, a voice recognition module 122, and a permittivity sensor 124.

The ultrasonic sensor 112 may check whether the occupant is present in each seat of the vehicle by emitting ultrasonic waves to a position of each seat in the vehicle.

The weight sensor 114 is provided to detect a load (or pressure) applied to the seat when the occupant is in a state of being accommodated in each seat of the vehicle. One weight sensor 114 may be provided on each seat to detect only whether the occupant is accommodated. Alternatively, weight sensors 114 may be provided to be distributed in a certain area for each seat to detect an area to which the load is applied by the occupant when the occupant is accommodated. The area is an area in which the occupant is accommodated and may be used as a standard for classifying the occupant's body size, and furthermore, whether the occupant gets on the vehicle again may be determined by determining the body size.

The radar 116 may check whether the occupant is present in each seat of the vehicle by emitting electromagnetic waves to the position of each seat in the vehicle.

The indoor camera 118 may check whether the occupant is present in each seat of the vehicle by capturing an image at the position of each seat in the vehicle.

The surround view monitoring camera 120 is provided to capture the surrounding images outside the vehicle. The controller 102 checks whether the occupant is present in each seat and whether the same occupant gets on the vehicle again by analyzing the captured images of the surround view monitoring camera 120.

The voice recognition module 122 is provided to analyze the voice of each occupant of each seat of the vehicle. The controller 102 checks whether the occupant is present in each seat and whether the same occupant gets on the vehicle again through voice analysis using the voice recognition module 122. To analyze the occupant's voice, the occupant's speech is a prerequisite, and to the present end, the controller 102 may output a guide message for inducing the occupant's speech through a speaker of the vehicle.

The permittivity sensor 124 is provided to detect a permittivity changed by bringing the occupant into contact with the seat when the occupant is accommodated in each seat of the vehicle. The controller 102 checks whether the occupant is present in each seat and whether the same occupant gets on the vehicle again based on the permittivity detected by the permittivity sensor 124.

The weight sensor 114 or the permittivity sensor 124 may be a sensor forming an occupant detection system (ODS). The ODS identifies the occupant based on "seated area+weight" or "seated area+permittivity."

The individual device 150 is a device provided on each seat of the vehicle and independently operated by the occupant of the corresponding seat. The individual device 150 may be a device operated by receiving power from a battery of the vehicle or a device operated by receiving power from an engine or a motor. The individual device 150 may include at least one of an individual heating wire seat 152, an individual ventilation seat 154, an individual air conditioner 156, and an individual monitor 158. The individual device 150 is not limited thereto and may further include other devices separately provided on each seat and operated independently. For example, when at least one of the individual heating wire seat 152, the individual ventilation seat 154, the individual air conditioner 156, and the individual monitor 158 is provided for each passenger seat, rear left seat, and rear right seat, the occupant sit on each of the passenger seat, the rear left seat, and the rear right seat may use a function of the corresponding individual device 150 by operating the individual device 150 of the seat on which he/she is currently seated, that is, at least one of the individual heating wire seat 152, the individual ventilation seat 154, the individual air conditioner 156, and the individual monitor 158.

The main monitor 170 is a display provided around a driver's seat (e.g., on a dashboard or on a center fascia) separately from the individual monitor 158 of the individual device 150. A state (ON/OFF or the like) of the individual device 150 provided on each seat may be displayed on the main monitor 170.

At least one component may be added or removed in accordance with the performance of the components of the vehicle shown in FIG. 1. Furthermore, it will be readily understood by those skilled in the art that the mutual positions of the components may be changed in accordance with the performance or structure of the system.

Meanwhile, each component shown in FIG. 1 refers to a software and/or hardware component such as a field programmable gate array (FPGA) and an application specific integrated circuit (ASIC).

Figure 2:
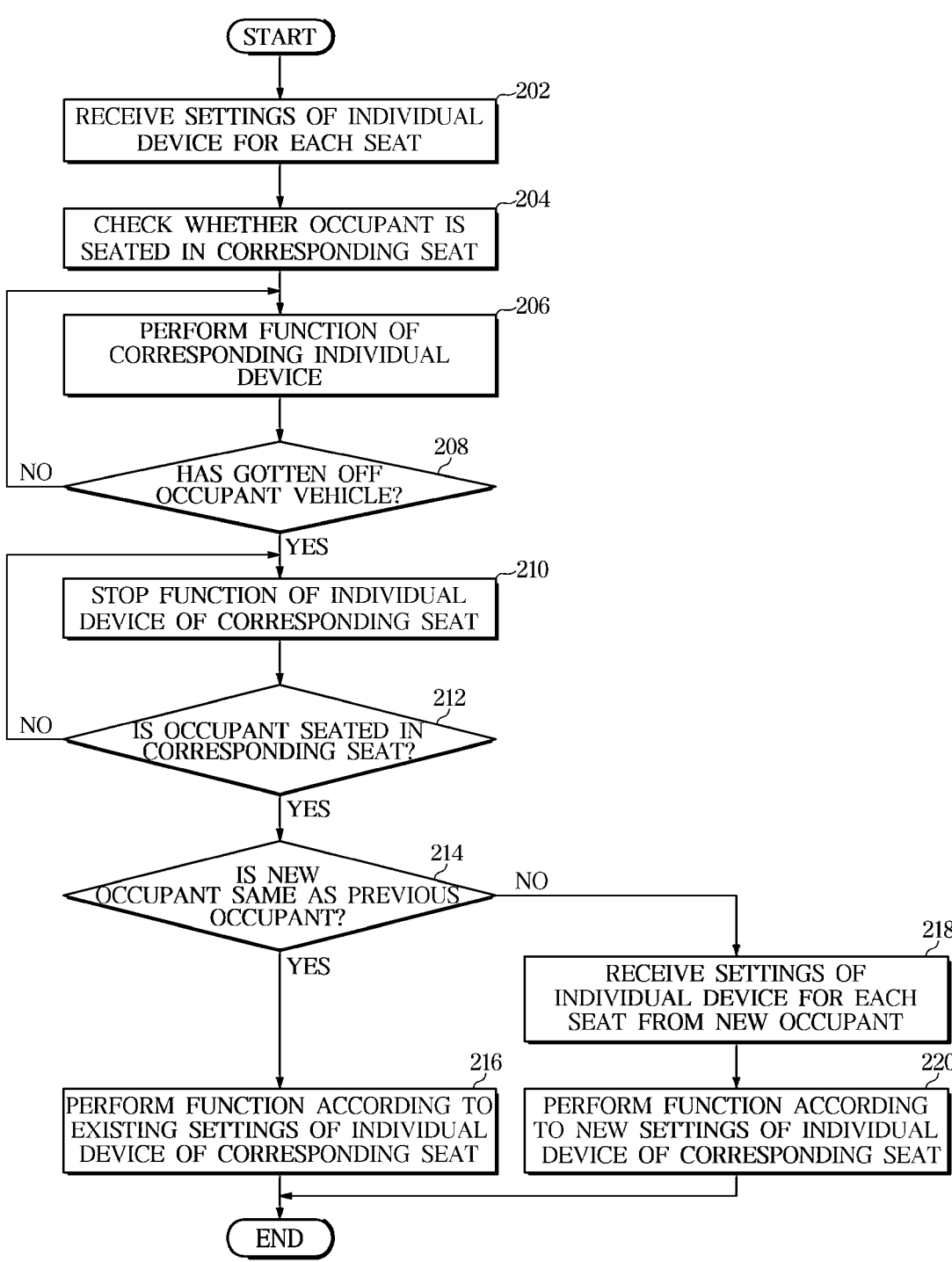
FIG. 2 is a view showing a method of controlling power of a vehicle according to an exemplary embodiment of the present disclosure.

FIG. 2 is a view showing a method of controlling power of a vehicle according to an exemplary embodiment of the present disclosure.

As shown in FIG. 2, the controller 102 receives settings (or change in settings) of the individual device 150 for each seat of the vehicle (202). For example, when the occupant is in a state of being accommodated in the rear right seat of the vehicle, the occupant of the corresponding seat may turn on the individual heating wire seat 152 or the individual monitor 158, which is an individual device 150 provided in the rear right seat. The controller 102 receives a "turn on" setting of the individual device.

When the settings (or change in the settings) are received from the individual device 150 of a specific seat, the controller 102 checks whether the occupant is accommodated in the corresponding seat (204). In other words, before performing the function of the individual device 150 of the corresponding seat, the controller 102 checks whether the occupant is actually present on the seat.

The controller 102 is configured to control the corresponding individual device 150 to perform the function of the individual device 150 of the corresponding seat when the occupant is present in the corresponding seat (206). Therefore, when an occupant of another seat other than the occupant of the corresponding seat erroneously operates the individual device 150 of the corresponding seat (when the occupant is not present on the corresponding seat), the controller 102 can prevent unnecessary energy consumption of the individual device 150 due to the erroneous operation by operating the corresponding individual device 150 only when the occupant is present on the corresponding seat without operating the individual device 150 of the corresponding seat (vacant seat).

The controller 102 monitors whether the occupant is accommodated for each seat in the vehicle through the occupant detector 110. When at least one of the occupants gets off the vehicle ("YES" in 208), the controller 102 stops the function (operation) of the individual device 150 operated in the corresponding seat (210). In other words, because the corresponding seat is vacant when the occupant gets off the vehicle, there is no need to operate the individual device 150 of the corresponding seat. Therefore, the controller 102 prevents unnecessary energy consumption due to the operation of the individual device 150 of the vacant seat in which no occupant is present by stopping the function (operation) of the individual device 150 of the corresponding seat from which the occupant has gotten off based on the detection of whether the occupant gets off the vehicle.

When the occupant gets on the vehicle and is reaccommodated in the corresponding seat from which the occupant has gotten off ("YES" in 212), the controller 102 checks whether a new occupant is the same as the previous occupant (214). The determination of whether the new occupant and the previous occupant are the same person (i.e., determination of whether to get on the vehicle again) is performed only within the same start ON state of the vehicle. In other words, the controller 102 detects whether the occupant gets off and then gets on the vehicle again during the time from start ON (or power ON) to start OFF (or power OFF) of the vehicle. The determination of whether the new occupant and the previous occupant are the same person (determination of whether to get on the vehicle again) may be performed by analyzing the image captured by the indoor camera 118 or the surround view monitoring camera 120. In other words, because whether the new occupant and the previous occupant are the same person may be determined using a face recognition technique, it is possible to determine whether the new occupant and the previous occupant are the same person. Alternatively, the determination of whether the new occupant and the previous occupant are the same person (determination of whether to get on the vehicle again) may be performed through the voice analysis of the occupant using the voice recognition module 122. In other words, when the results of the voice analysis match at a certain level or more, it may be determined that the new occupant and the previous occupant are the same person. Alternatively, the determination of whether the new occupant and the previous occupant are the same person (determination of whether to get on the vehicle again) may be performed through the ODS. For example, it may be determined that the new occupant and the previous occupant are the same person by comparing "seated area+weight" or "seated area+permittivity" when the occupant is seated using the weight sensor 114 or the permittivity sensor 124.

In the exemplary embodiment of the present disclosure, the controller 102 is configured to control the individual devices 150 in different methods by dividing the case where the new occupant and the previous occupant are the same and the case where they are not the same. When the new occupant is the same person as the previous occupant ("YES" in 214), the function of the corresponding individual device 150 is performed according to the existing settings of the individual device 150 of the corresponding seat (216). For example, when the previous occupant gets off and gets on the vehicle again within the same start ON state of the vehicle (new occupant=previous occupant), the settings of the individual device 150 of the corresponding seat are performed without change. Therefore, the occupant may use the individual device 150 without change with the existing settings without additional operation of the individual device 150.

Figure 3:
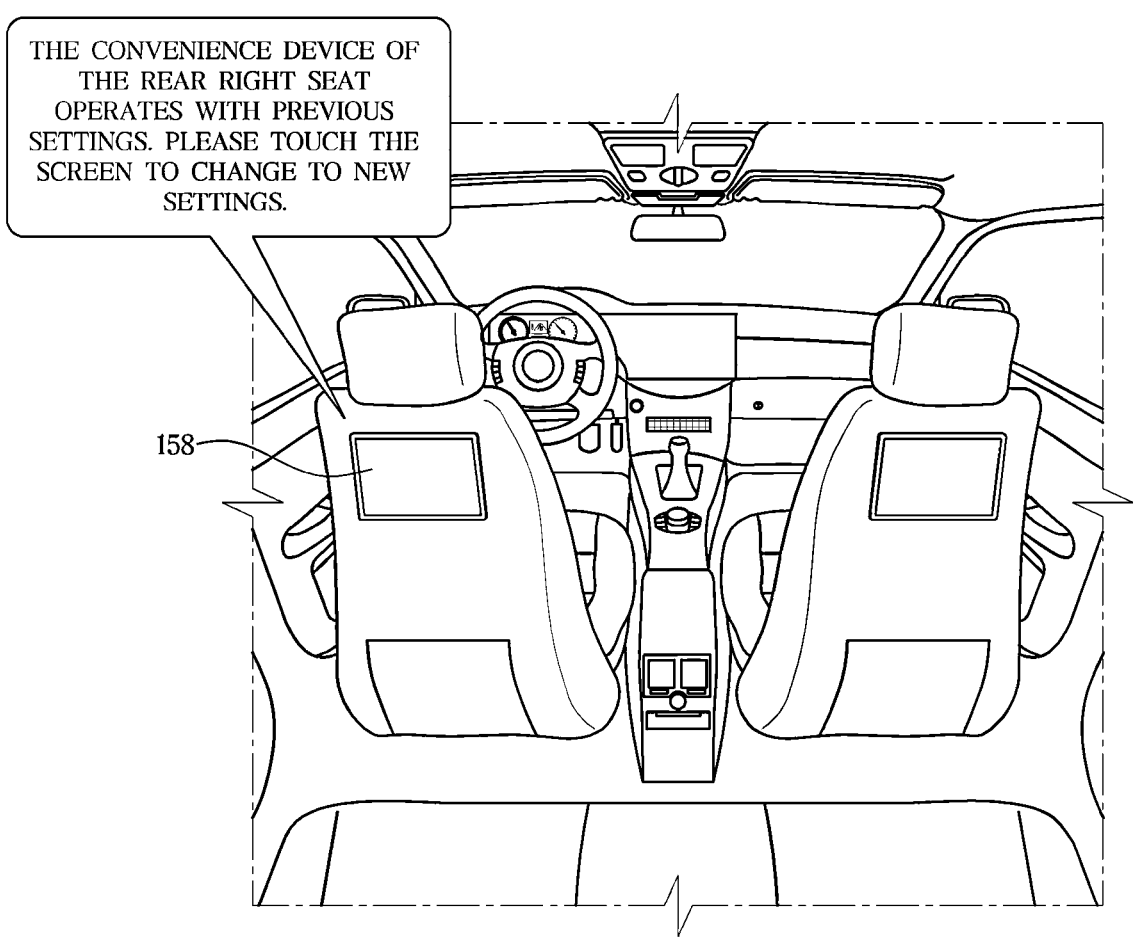
FIG. 3 is a view showing an output of a guide message for guiding a change in existing settings.

However, when the new occupant is the same person as the previous occupant, the existing settings of the individual device 150 are maintained, and the existing settings may be changed when the occupant desires to change the existing settings through an output of the guide message as shown in FIG. 3 or 4. FIG. 3 and FIG. 4 are views showing the output of the guide message for guiding the change in existing settings. First, as shown in FIG. 3, when the new occupant is the same person as the previous occupant, a voice-type guide message such as "The convenience device of the rear right seat operates with the previous settings. Please touch the screen to change the existing settings to new settings," is output through the speaker (or separate speaker) of the individual monitor 158 of the corresponding seat so that the occupant of the corresponding seat may change the existing settings to his or her desired new settings when he/she desires the new settings. Alternatively, as shown in FIG. 4, when the new occupant is the same person as the previous occupant, a text-type guide message such as "The convenience device of the rear right seat operates with the previous settings. Please touch the screen to change the existing settings to new settings." is output on the screen of the individual monitor 158 of the corresponding seat so that the occupant of the corresponding seat may change the existing settings to his or her desired new settings when he/she desires the new settings.

Referring back to FIG. 2, when the new occupant is not the same person as the previous occupant ("NO" in 214), the controller 102 receives settings of the individual device 150 of the corresponding seat from the new occupant (218) and performs a function according to the new settings of the individual device 150 (220).

Figure 5:
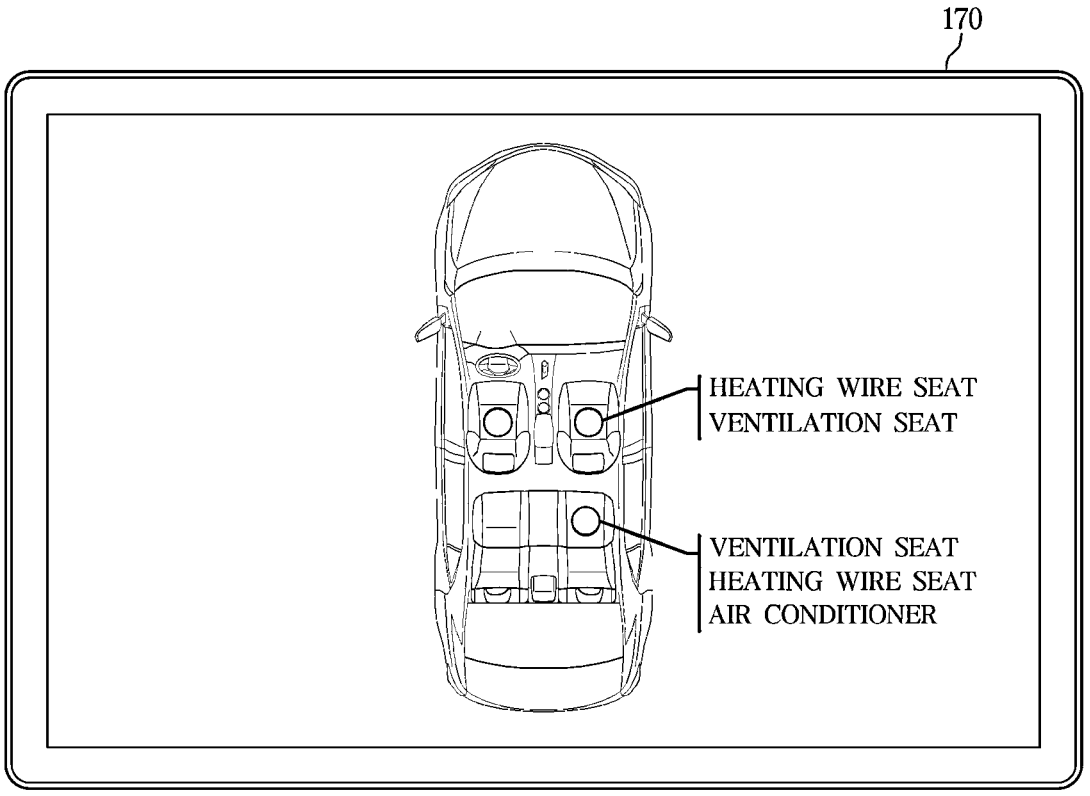
FIG. 5 is a view showing that operating states of individual devices for each seat of the vehicle are displayed on a main monitor according to an exemplary embodiment of the present disclosure.

FIG. 5 is a view showing that operating states of individual devices for each seat of the vehicle are displayed on a main monitor according to an exemplary embodiment of the present disclosure.

As shown in FIG. 5, the current state of the individual device 150 of each of the passenger seat, the rear left seat, and the rear right seat is displayed on the screen of the main monitor 170 so that a driver may check the current state of each of the individual device 150. In FIG. 5, only the individual device 150 currently activated (turned on and operated) among the individual devices 150 for each seat is selectively displayed on the screen of the main monitor 170. In FIG. 5, the individual heating wire seat 152 and the individual ventilation seat 154 in the passenger seat are turned on. Furthermore, in FIG. 5, the individual heating wire seat 152, the individual ventilation seat 154, and the individual air conditioner 156 in the rear right seat are turned on.

Meanwhile, the disclosed exemplary embodiments of the present disclosure may be implemented in a form of a recording medium configured to store instructions executable by a computer. The instructions may be stored in a form of program code and may perform the operations of the disclosed exemplary embodiments by generating a program module when executed by a processor. The recording medium may be implemented as a computer-readable recording medium.

The computer-readable recording medium includes all types of recording media in which the instructions readable by the computer are stored. For example, there may be a read only memory (ROM), a random access memory (RAM), a magnetic tape, a magnetic disk, a flash memory, an optical data storage device, and the like.

According to the above configuration, it is possible to reduce power (energy) consumption of a vehicle by checking whether an occupant is present in each seat and automatically turning off an individual device of a seat in which no occupant is present.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling power of a vehicle including an individual device provided on each seat of the vehicle to be independently operated by an occupant of a corresponding seat, the method comprising:

detecting whether the occupant is present in each seat of the vehicle;

when a vacant seat in which no occupant is present is detected, turning off, by a controller electrically connected to the individual device, the individual device provided on the corresponding seat;

determining, by the controller, whether a new occupant is a same person as a previous occupant of the corresponding seat when the new occupant is accommodated in the vacant seat; and maintaining, by the controller, existing settings of the individual device of the corresponding seat without change of the existing settings to operate the individual device when the controller concludes that the new occupant is the same person as the previous occupant, wherein the controller, only when maintaining a start ON state, detects whether the occupant gets off and gets on the vehicle again and refrains from detecting whether the occupant gets off and gets on the vehicle again when the vehicle is in a start OFF state.

2. The method of claim 1, further including outputting, by the controller, a guide message for selecting whether to maintain or change the existing settings of the individual device of the corresponding seat when the controller concludes that the new occupant is the same person as the previous occupant.

3. The method of claim 2, wherein the outputting of the guide message includes at least one of outputting a voice through a speaker electrically connected to the controller and outputting a text through a display electrically connected to the controller.

4. The method of claim 1, further including:

receiving, by the controller, new settings of the individual device from the new occupant when the new occupant is not the same person as the previous occupant; and operating, by the controller, the individual device of the corresponding seat based on the new settings of the individual device.

5. The method of claim 1, wherein the detecting of whether the occupant is present and the determining of whether the new occupant is the same person are performed by analyzing an image captured using at least one of an indoor camera electrically connected to the controller and a surround view monitoring camera electrically connected to the controller.

6. The method of claim 1, wherein the detecting of whether the occupant is present and the determining of whether the new occupant is the same person are performed by the controller using at least one of a radar and an ultrasonic sensor electrically connected to the controller.

7. The method of claim 1, wherein the detecting of whether the occupant is present and the determining of whether the new occupant is the same person are performed by the controller using at least one of a weight sensor and a permittivity sensor electrically connected to the controller.

8. A vehicle comprising:

an individual device provided on each seat of the vehicle to be independently operated by an occupant of a corresponding seat;

an occupant detector provided to detect whether the occupant is present inside the vehicle and identify the occupant; and a controller operatively connected to the individual device and the occupant detector and configured to detect whether the occupant is present in each seat of the vehicle using the occupant detector, and when the controller concludes that a vacant seat in which no occupant is present is detected, turn off the individual device provided on the corresponding seat, wherein the controller is further configured to:

determine whether a new occupant is a same person as a previous occupant of the corresponding seat when the new occupant is accommodated in the vacant seat;

maintain existing settings of the individual device of the corresponding seat without change of the existing settings to operate the individual device when the controller concludes that the new occupant is the same person as the previous occupant, and wherein the controller, only when maintaining a start ON state, detects whether the occupant gets off and gets on the vehicle again and refrains from detecting whether the occupant gets off and gets on the vehicle again when the vehicle is in a start OFF state.

9. The vehicle of claim 8, wherein the controller is configured to output a guide message for selecting whether to maintain or change the existing settings of the individual device of the corresponding seat when the controller concludes that the new occupant is the same person as the previous occupant.

10. The vehicle of claim 9, wherein the output of the guide message includes at least one of a voice output through a speaker electrically connected to the controller and a text output through a display electrically connected to the controller.

11. The vehicle of claim 8, wherein the controller is configured to:

receive new settings of the individual device from the new occupant when the new occupant is not the same person as the previous occupant; and operate the individual device of the corresponding seat based on the new settings of the individual device.

12. The vehicle of claim 8, wherein the detecting of whether the occupant is present and the determining of whether the new occupant is the same person are performed, by the controller, by analyzing an image captured using at least one of an indoor camera electrically connected to the controller and a surround view monitoring camera electrically connected to the controller.

13. The vehicle of claim 8, wherein the detecting of whether the occupant is present and the determining of whether the new occupant is the same person are performed using at least one of a radar and an ultrasonic sensor electrically connected to the controller.

14. The vehicle of claim 8, wherein the detecting of whether the occupant is present and the determining of whether the new occupant is the same person are performed using at least one of a weight sensor and a permittivity sensor electrically connected to the controller.

15. A method of controlling power of a vehicle including an individual device provided on each seat of the vehicle to be independently operated by an occupant of a corresponding seat, the method comprising:

detecting whether the occupant is present in each seat of the vehicle;

turning off, by a controller operatively connected to the individual device, the individual device provided on the corresponding seat when a vacant seat in which no occupant is present is detected;

determining, by the controller, whether a new occupant is a same person as a previous occupant of the corresponding seat when the new occupant is accommodated in the vacant seat;

outputting, by the controller, a guide message for selecting whether to maintain or change existing settings of the individual device of the corresponding seat when the controller concludes that the new occupant is the same person as the previous occupant;

maintaining, by the controller, the settings of the individual device of the corresponding seat as the existing settings without change to operate the individual device;

receiving, by the controller, new settings of the individual device from the new occupant when the controller concludes that the new occupant is not the same person as the previous occupant; and operating, by the controller, the individual device of the corresponding seat based on the new settings of the individual device, wherein the controller, only when maintaining a start ON state, detects whether the occupant gets off and gets on the vehicle again and refrains from detecting whether the occupant gets off and gets on the vehicle again when the vehicle is in a start OFF state.

16. The method of claim 15, wherein the detecting of whether the occupant is present and the determining of whether the new occupant is the same person are performed by the controller by analyzing an image captured using at least one of an indoor camera electrically connected to the controller and a surround view monitoring camera electrically connected to the controller.

17. The method of claim 15, wherein the detecting of whether the occupant is present and the determining of whether the new occupant is the same person are performed using at least one of a radar and an ultrasonic sensor electrically connected to the controller.

18. The method of claim 15, wherein the detecting of whether the occupant is present and the determining of whether the new occupant is the same person are performed using at least one of a weight sensor and a permittivity sensor electrically connected to the controller.

\* \* \* \* \*